(12) United States Patent
Siewiera (10) Patent No.: US 12,482,573 B2
(45) Date of Patent: Nov. 25, 2025

(54) INTEGRATED MULTIMEDIA INFORMATION EXCHANGE SYSTEM ESPECIALLY IN THE EMERGENCY MEDICAL SYSTEM

(71) Applicant: Alfaresq Sp. z.o.o., Lublin (PL)

(72) Inventor: Jacek Siewiera, Warsaw (PL)

(73) Assignee: Alfaresq Sp. z.o.o., Lublin (PL)

( * ) Notice: Subject to any disclaimer, the term of this patent is extended or adjusted under 35 U.S.C. 154(b) by 0 days.

(21) Appl. No.: 18/122,383

(22) Filed: Mar. 16, 2023

(65) Prior Publication Data

US 2024/0242850 A1     Jul. 18, 2024

(30) Foreign Application Priority Data

Jan. 13, 2023   (PL) .......................... 443466

(51) Int. Cl.
*G16H 80/00* (2018.01)
*H04N 7/18* (2006.01)
*H04B 1/3827* (2015.01)

(52) U.S. Cl.
CPC ............. *G16H 80/00* (2018.01); *H04N 7/183* (2013.01); *H04B 1/385* (2013.01)

(58) Field of Classification Search
None
See application file for complete search history.

(56) References Cited

U.S. PATENT DOCUMENTS

2022/0181019 A1\* 6/2022 Ukrainksy ............. A61B 50/20
2022/0301666 A1\* 9/2022 Shluzas .................... G06N 3/04

\* cited by examiner

*Primary Examiner* — Samira Monshi
(74) *Attorney, Agent, or Firm* — Harness, Dickey & Pierce, P.L.C.; Stephen T. Olson (57) ABSTRACT

The present invention relates to an integrated system for the exchange of information in the implementation of medical first aid especially in the emergency medical system by people with a headset device.

17 Claims, 7 Drawing Sheets

INTEGRATED MULTIMEDIA INFORMATION EXCHANGE SYSTEM ESPECIALLY IN THE EMERGENCY MEDICAL SYSTEM

CROSS-REFERENCE TO RELATED APPLICATIONS

This application claims the benefit and priority of Polish Patent Application No. P.443466, filed on Jan. 13, 2023. The entire disclosure of the above application is incorporated herein by reference.

FIELD

The present disclosure relates to an integrated system for the exchange of information in the implementation of medical first aid especially in the emergency medical system by people with a headset device.

BACKGROUND

This section provides background information related to the present disclosure which is not necessarily prior art.

Currently, the emergency medical system provides medical assistance to people in a state of sudden danger to health and/or life. In the existing system there is assistance, implemented through emergency numbers (e.g. 112) where the phone call is redirected to the emergency medical dispatch center, and then from the dispatch center to the ambulance team, which, after arriving at the scene of the accident, proceeds to implement first aid in a pre-hospital setting.

While waiting for professional help from the ambulance team, the emergency phone dispatcher can:
  (a) support the third party with advice, but only with an audio (telephone) connection,
  (b) get acquainted with the emergency situation, but only through an interview with a third party (questionnaires defined by procedure serve this purpose),
  (c) to a limited extent, instruct a third party regarding the provision of emergency medical first aid.

The lack of a more effective system of information exchange (long-distance communication) between the scene of an emergency and the emergency telephone dispatcher, and thus the lack of a coordinated third-party assistance system, can significantly limit the effectiveness of first aid.

The present invention provides such a system for the exchange of information in the provision of first aid by third parties with a headset device and a first-aid kit dedicated to the headset device, who are in a shortage of time and the stress of an emergency situation.

In emergency situations, time, accuracy o assessing the situation (diagnosis) and selecting intervention methods are very important, the present invention provides a first aid system with professional components. Using the headset device with the whole system is convenient, professional, intuitive and quick to use, which effectively solves the urgent need to save the health and/or life of a person in a crisis situation.

SUMMARY

This section provides a general summary of the disclosure, and is not a comprehensive disclosure of its full scope or all of its features.

The object of the present invention is an integrated audio-video information exchange system for the implementation of medical first aid, which includes a headset device, a dedicated first aid kit and an operator center.

The system where the headset device includes a video module, an audio module, a lighting module, a wireless data exchange module, and an attachment system on the user's head.

The system where the video module includes a camera.

The system where the audio module includes speakers and a microphone.

The system where the lighting module includes a lamp.

The system where the wireless data exchange module includes a network.

The system, where the attachment on the head of the user is adjustable straps.

The system that transmits audio and/or video information over the network received from a coupled headset device to the network—the operator's center computer.

The system, where the wireless data exchange system transmits and receives information via military radios, starlink, GSM network.

The system where the dedicated first aid kit is the unit that charges the headset device via a portable battery and magnetic link.

The system where a dedicated first aid kit has medical supplies and dressings colors-coded and pictograms.

The system where the operator's center has a computer with software connected to all the headset device.

Terms used above and in the description and claims, have the following meanings:

The term "pre-medical first aid", as used herein, means a set of activities aimed at saving the life of an injured person in a medical emergency until the arrival of qualified medical services (such as an ambulance with personnel). These actions are taken by the people on the scene of the emergency.

The term "emergency situation", as used herein, means any circumstance requiring first aid.

The term "a third-party", as used herein means a first-aider carrying a headset device with a dedicated first-aid kit—this is a person who is not a trained paramedic, doctor or nurse.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The integrated multimedia information exchange system (shown in FIGS. 1-7) for use especially in the emergency medical system improves information about the injured person in an emergency situation, thereby positively influencing the effectiveness of the first aid carried out using it and helping to avoid critical errors.

The integrated multimedia information exchange system for use especially in the emergency medical system includes:
(a) headset device (glasses—FIGS. 1, 3, 4) equipped with (markings on the figures):
1. video module,
2. audio module,
3. lighting module,
4. wireless data exchange module (GSM/LTE modem),
5. attachment system on the user's head
(b) a dedicated first aid kit (which is also a protective case for the headset device) (FIG. 2),
(c) dedicated software,
(d) Center-operator, having a dedicated receiver The video module (camera) collects information in the form of image(s), while the audio module (speakers microphones) collects audio information.

The two modules (video and audio) constitute a communication module and operate together, and can also operate alternately in the absence of a connection, such as video. The communication module transmits the aforementioned data in real time to a dedicated receiver in the operator's center, and feedbacks voice information and commands from the operator's center to the third-party responder's headset device in real time.

The lighting module (lamp) supports image recording in difficult lighting conditions. By illuminating the image in a crisis situation, it allows the appropriate image to be sent to the operator's center.

Figure 5:
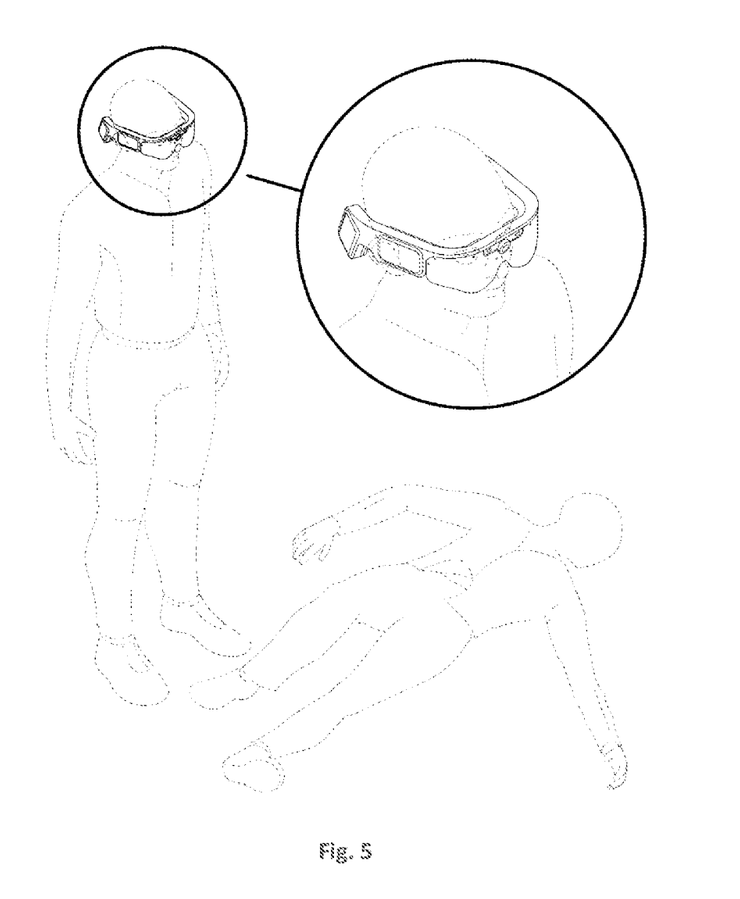
FIG. 5 illustrates a third party with a headset prepared to provide first aid.
Figure 6A:
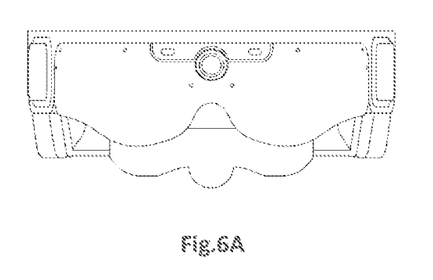
FIG. 6A illustrates the headset device in a front view.
Figure 6B:
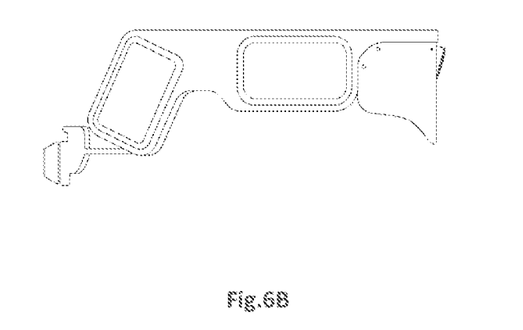
FIG. 6B illustrates the headset device in a side view.
Figure 6C:
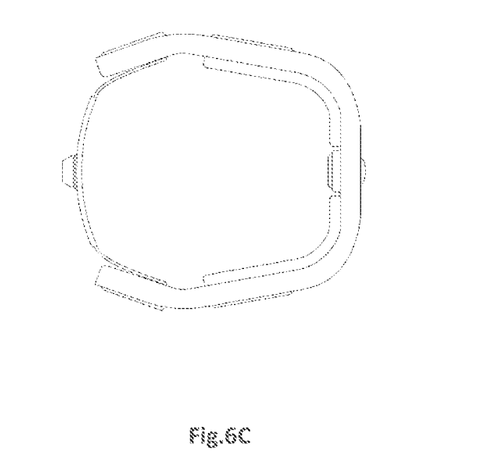
FIG. 6C illustrates the headset device in a top view.
Figure 6D:
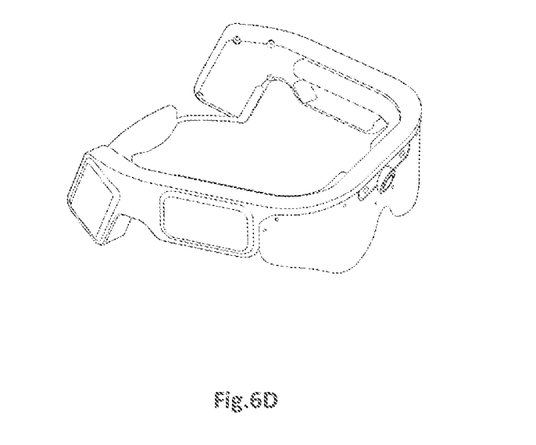
FIG. 6D illustrates the headset device in a front-side-top axonometric view.
Figure 6E:
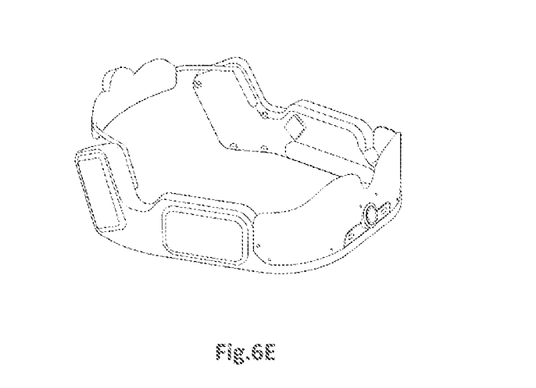
FIG. 6E illustrates the headset device in a front-side-bottom axonometric view.
Figure 6F:
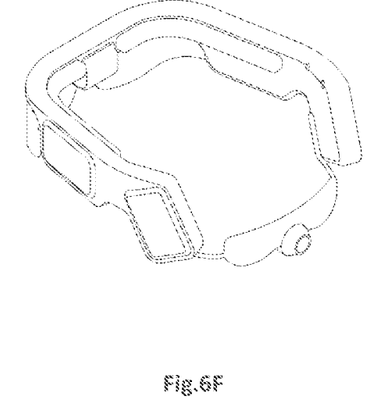
FIG. 6F illustrates the headset device in a rear-side-top axonometric view.
Figure 7:
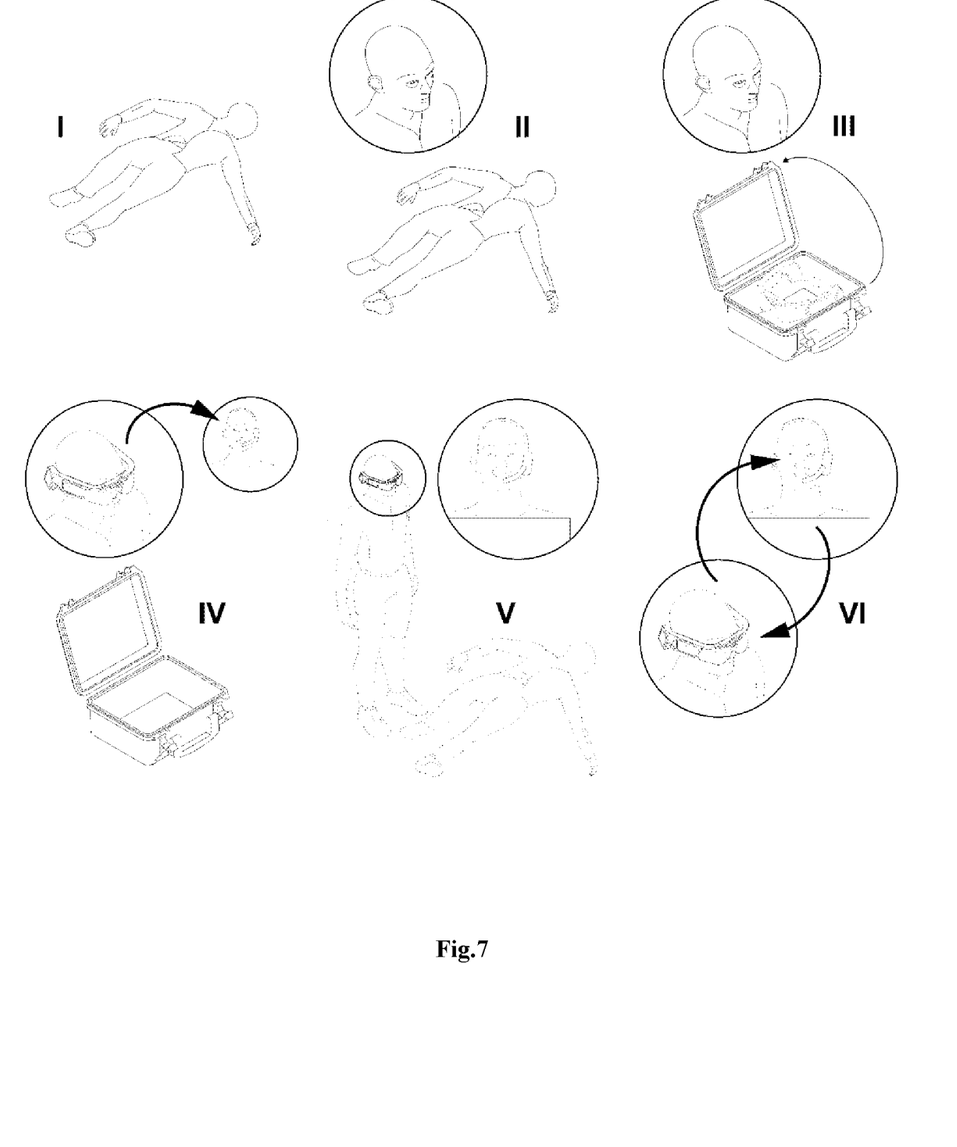
FIG. 7 illustrates a diagram of the emergency assistance provided by a third party with a headset device:
I. Injured person in a crisis situation,
II. Involvement of a third party,
III. Removal of the head unit from the first aid kit,
IV. Automatic establishment of audio and video communication with the center-operator,
V. Performed by a third party with a headset device to assist under pre-hospital conditions,
VI. Information exchange with the dispatch center (center) within the system.

In an emergency situation, real-time information about the condition of the person requiring first aid is collected, audio data and/or video data are transmitted to the operator center. The audio system provides conversation capability, analogous to a telephone call, while the hands of the third-party first-aider remain free (FIGS. 5, 7).

The wireless data exchange module—audio/video is transmitted over the network, i.e. military radios, starlink, GSM network. Audio and video data is exchanged via wireless technologies ie GSM/LTE, WiFi over a secured channel (communication is encrypted).

The headset device independently establishes a connection after detaching them from the landing unit (first aid kit). A third party, after removing the headset device from the package, which is also a dedicated first aid kit, connects to the center—the operator.

The second path for wireless audio/video data exchange is through the center-operator connection, where, at the press of a button in a program on the computer, the center connects to the data/selected headset device.

For GSM connections, a GSM/LTE modem is used. For other connections, WiFi is used.

The present invention can also be used in various telecommunications networks, with different tariff offerings, through which a first-aider with a headset device connects to the operator's center. The headset device (video module and/or audio module (communication module) must communicate via audio and video information of the user with audio and video of the operator at the center.

The attachment system on the user's head—straps that are adjustable. This makes it easy to adjust the device on the user's head.

The dedicated first aid kit is a package that can be in the form of a bag or backpack or suitcase.

Figure 1:
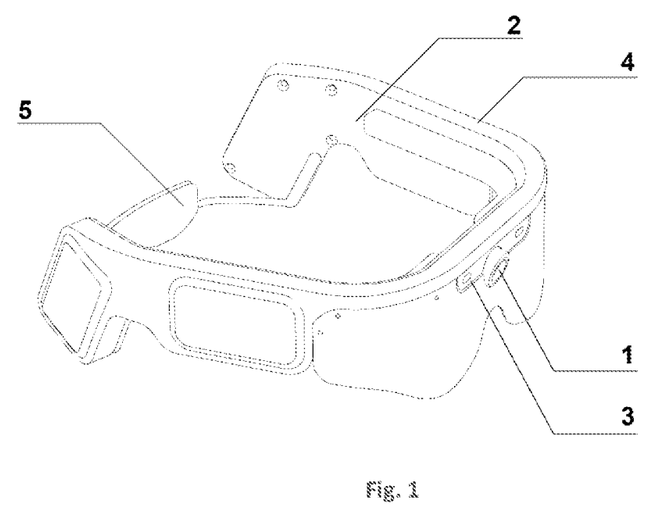
FIG. 1 illustrates the headset device in axonometry.
Figure 2:
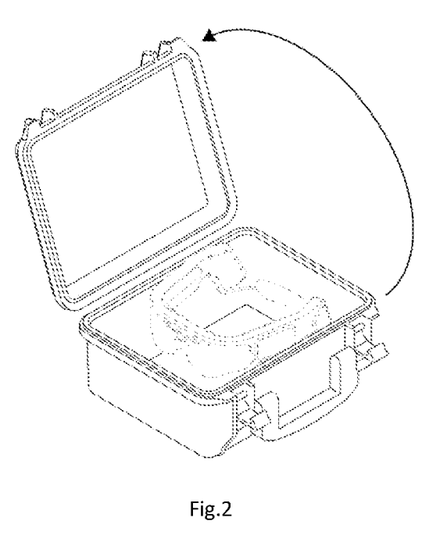
FIG. 2 illustrates an example of a dedicated first aid kit.
Figure 3:
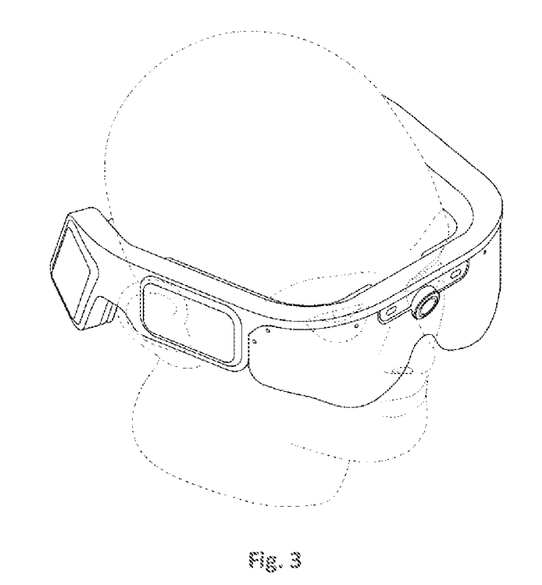
FIG. 3 illustrates the headset device placed/worn on the head.
Figure 4:
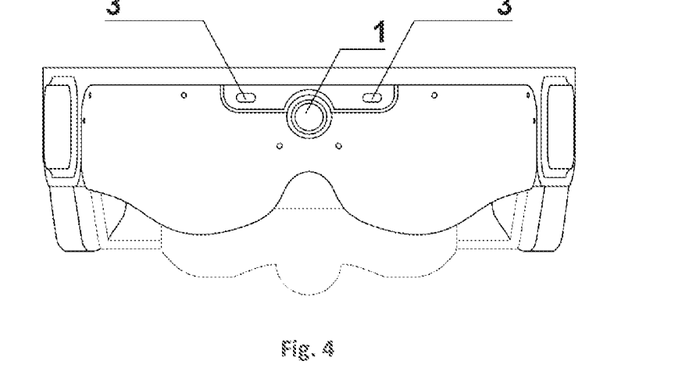
FIG. 4 illustrates the headset device in front view.

Dedicated first aid kit, is a charging unit for the headset device (has a rechargeable battery/portable battery) and its case, in addition to containing dressing supplies, pulse oximeter, defibrillator, etc., marked with symbols/pictograms, i.e. circle, square, triangle, and colors that ensure the appropriate use of specific medical equipment and/or dressing material at any given time.

The charging unit of the headset device is a portable battery (power bank) with a magnetic connection (magnetic link). The headset device has a battery, which is charged through the cable. Breaking the magnetic connection activates the headset device.

If the third party providing first aid is a visually impaired person, e.g. one with daltonism, the symbols on the various means or devices are the basis for their correct distinction and application.

For a person without a visual impairment, both colors and symbols (pictograms) are used to distinguish between different agents or medical devices.

These markings are also very important due to emergency situations that are under time pressure and emotional pressure, making it very easy to use them correctly according to the instructions given by the center—operator.

The dedicated software—a server that connects both parties, i.e., the third party with the headset device and the center-operator.

The center-operator, a person qualified to provide medical first aid, has a computer with dedicated software to connect to all headset devices both after they have been activated by a third party (pulling them out of the case/apparatus) and by the operator selecting a specific headset device.

The entire system is operated remotely—from the center—the operator i.e. a third party, direct user does not have the ability to control all modules of the headset device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGures. Spatially relative terms may be intended to encompass different orientations of the device in use or operation in addition to the orientation depicted in the FIGures. For example, if the device in the FIGures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An integrated audio-video information exchange system in the implementation of medical first aid, the system comprising:
    a headset device including a communication module, a wireless data exchange module, and an attachment system configured to attach the headset device to a user's head;
    a first aid kit including medical equipment marked by colors and pictograms and a portable battery with a magnetic connection, the first aid kit being configured to function as a charging unit for the headset device when the headset device is connected to the portable battery via the magnetic connection; and
    an operator center remote from the headset device and including a computer with software connected to all headset modules, wherein the software is a server that allows the operator center to control the communication module and the wireless data exchange module of the headset device, and wherein the headset device is configured to limit control of the communication module and the wireless data exchange module by the user of the headset device.

2. The system according to claim 1, wherein the communication module includes a video module and an audio module.

3. The system according to claim 2, wherein the video module includes a camera.

4. The system according to claim 2, wherein the audio module contains speakers and a microphone.

5. The system according to claim 1, wherein the headset device further includes a lighting module, and wherein the lighting module includes a lamp.

6. The system according to claim 1, wherein the wireless data exchange module includes a network.

7. The system according to claim 1, wherein the attachment system includes adjustable straps.

8. The system according to claim 1, wherein the wireless data exchange module is configured to transmit and receive audio and video data over a network.

9. The system according to claim 8, wherein the wireless data exchange module is configured to transmit and receive audio and video data via military radios, starlink, or GSM network.

10. The system according to claim 1, wherein the medical equipment of the first aid kit includes dressing supplies, a pulse oximeter, or a defibrillator marked with symbols and/or pictograms configured to ensure appropriate use of the medical equipment at a given time.

11. The system according to claim 1, wherein the headset device is configured to:
    transmit audio and video data to the operator center in real time; and
    receive audio and video data from the operator center in real time to support a conversation with the user of the headset device and a receiver in the operator center in real time.

12. The system according to claim 1, wherein the headset device further includes a battery.

13. The system according to claim 12, further comprising:
a cable configured to connect the headset device to the magnetic connection of the portable battery of the first aid kit to facilitate charge of the battery of the headset device.

14. An integrated audio-video information exchange system in the implementation of medical first aid, the system comprising:
a headset device including a communication module, a wireless data exchange module, an attachment system configured to attach the headset device to a user's head, and a battery;
a first aid kit including medical equipment marked by colors and pictograms and a portable battery with a magnetic connection, the first aid kit being configured to function as a charging unit for the headset device when the headset device is connected to the portable battery via the magnetic connection;
a cable configured to connect the headset device to the magnetic connection of the portable battery of the first aid kit to facilitate charge of the battery of the headset device; and
an operator center remote from the headset device and including a computer with software connected to all headset modules,
wherein, when the headset device is disconnected from the magnetic connection of the portable battery of the first aid kit, the headset device is automatically activated and automatically establishes wireless video and audio communication with the operator center.

15. The system according to claim 14, wherein the operator center, via the computer with the software, is configured to selectively connect to the headset device and initiate wireless audio and video data exchange therewith.

16. The system according to claim 1, wherein the user is a person prepared to provide first aid to a subject in need thereof.

17. The system according to claim 1, wherein the first aid kit is a protective case for the headset device.

* * * * *